US010000200B2

(12) United States Patent
Jade et al.

(10) Patent No.: US 10,000,200 B2
(45) Date of Patent: Jun. 19, 2018

(54) TORQUE RESERVE IN A HYBRID SYSTEM

(71) Applicant: Robert Bosch GmbH, Stuttgart (DE)

(72) Inventors: Shyam Jade, Birmingham, MI (US); Jason Schwanke, Southfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 14/997,908

(22) Filed: Jan. 18, 2016

(65) Prior Publication Data

US 2017/0182994 A1 Jun. 29, 2017

Related U.S. Application Data

(60) Provisional application No. 62/271,764, filed on Dec. 28, 2015.

(51) Int. Cl.
*B60W 20/19* (2016.01)
*B60W 30/182* (2012.01)
*B60K 6/442* (2007.10)
*B60K 6/48* (2007.10)
*B60K 6/485* (2007.10)
*B60W 10/06* (2006.01)
*B60W 10/08* (2006.01)
*B60W 30/188* (2012.01)
*B60W 20/11* (2016.01)

(52) U.S. Cl.
CPC ............. *B60W 20/19* (2016.01); *B60K 6/442* (2013.01); *B60K 6/48* (2013.01); *B60K 6/485* (2013.01); *B60W 10/06* (2013.01); *B60W 10/08* (2013.01); *B60W 20/11* (2016.01); *B60W 30/182* (2013.01); *B60W 30/1882* (2013.01); *B60K 2006/4825* (2013.01); *B60W 2510/0638* (2013.01); *B60W 2540/10* (2013.01)

(58) Field of Classification Search
CPC ............... B60W 20/19; B60W 30/182; B60W 2510/0638; B60W 2540/10; B60W 10/06; B60W 10/08; B60W 20/10; B60W 30/1882

See application file for complete search history.

(56) References Cited

U.S. PATENT DOCUMENTS

| 7,878,175 | B2 | 2/2011 | Livshiz et al. | |
| 8,200,382 | B2 | 6/2012 | Hahn | |
| 8,280,570 | B2 * | 10/2012 | Masuda | B60W 10/06 180/65.235 |
| 8,473,133 | B2 * | 6/2013 | Wang | B60W 10/06 180/65.265 |
| 8,831,812 | B2 | 9/2014 | Blessing | |
| 8,838,316 | B2 | 9/2014 | Whitney et al. | |

(Continued)

*Primary Examiner* — Todd Melton
(74) *Attorney, Agent, or Firm* — Michael Best & Friedrich LLP

(57) ABSTRACT

Devices, methods, and systems including a controller for a hybrid system. The controller includes an electronic processor configured to receive inputs defining a current condition of the hybrid system. The inputs include an acceleration input and an engine speed input. The electronic processor is configured to determine a desired torque based at least in part on the acceleration input, determine an actual torque based at least in part on the engine speed input, and set a torque strategy to operate an internal combustion engine at a high efficiency level when the desired torque is different than the actual torque.

17 Claims, 8 Drawing Sheets

(56) References Cited

U.S. PATENT DOCUMENTS

| | | | |
|---|---|---|---|
| 8,948,950 B2* | 2/2015 | Saito | B60K 6/445 |
| | | | 180/65.21 |
| 9,026,293 B2* | 5/2015 | Ito | B60K 6/445 |
| | | | 180/65.265 |
| 9,027,680 B2* | 5/2015 | Sawada | B60K 6/445 |
| | | | 180/65.275 |
| 9,067,587 B1* | 6/2015 | Johri | B60W 20/10 |
| 9,168,914 B2* | 10/2015 | Martin | B60W 10/06 |
| 9,744,965 B2* | 8/2017 | Choi | B60W 20/13 |
| 2008/0109125 A1 | 5/2008 | Hahn | |
| 2009/0118946 A1 | 5/2009 | Heap et al. | |
| 2013/0096758 A1 | 4/2013 | Yuille et al. | |
| 2013/0325228 A1 | 12/2013 | Whitney et al. | |
| 2014/0077610 A1 | 3/2014 | Zhang et al. | |
| 2014/0200758 A1* | 7/2014 | Baba | B60W 10/105 |
| | | | 701/22 |
| 2015/0051762 A1 | 2/2015 | Banker et al. | |
| 2016/0009271 A1* | 1/2016 | Choi | B60W 40/09 |
| | | | 701/22 |
| 2016/0208718 A1* | 7/2016 | Kim | F02D 29/02 |

* cited by examiner

TORQUE RESERVE IN A HYBRID SYSTEM

CROSS-REFERENCE TO RELATED APPLICATION

This application claims the benefit of U.S. Provisional Application No. 62/271,764, filed Dec. 28, 2015, which is hereby incorporated by reference.

BACKGROUND

In hybrid systems, torque demands are fulfilled using both an electric motor and an internal combustion (IC) engine. For various reasons, there are several occasions where the driver demanded torque and the output torque of the internal combustion engine are deliberately set to different values. Typically, the internal combustion engine is temporarily operated in an inefficient manner to match the internal combustion engine output torque to the driver demanded torque after a delay. However, temporarily operating the internal combustion engine in the inefficient manner reduces combustion efficiency and leads to poorer fuel efficiency. Further, temporarily operating the internal combustion engine in the inefficient manner can also lead to lower dynamic performance of the vehicle if torque requests are delayed excessively.

SUMMARY

In certain embodiments described herein, it is possible to operate an internal combustion engine in an efficiency mode or a performance mode. The efficiency mode stores a torque reserve in a battery of the hybrid system. The performance mode provides a fast torque response. In some embodiments, the performance mode is used in tandem with the efficiency mode, and the performance mode can provide the fast torque response using the torque reserve stored in the battery of the hybrid system. Certain methods, devices, and systems described herein allow for internal combustion engines to be operated in a highly efficient manner in either an efficiency mode or a performance mode to improve at least one of fuel economy, engine performance, or dynamic performance of the vehicle. The efficiency mode and the performance mode do not operate simultaneously, but instead can operate in tandem with each other, or independently of each other.

One exemplary embodiment is directed to a controller for a hybrid system comprising an electronic processor configured to receive inputs defining a current condition of the hybrid system including an acceleration input and an engine speed input. The electronic processor is also configured to determine a desired torque based on the inputs defining the current condition of the hybrid system including the acceleration input, determine an actual torque based on the inputs defining the current condition of the hybrid system including the engine speed input, and set a torque strategy to operate an internal combustion engine at a high efficiency level when the desired torque is different than the actual torque.

Another exemplary embodiment is directed to a method for controlling a hybrid system. The method includes receiving, by an electronic processor, inputs defining a current condition of the hybrid system, wherein the inputs include an acceleration input and an engine speed input, determining, by the electronic processor, a desired torque based at least in part on the acceleration input, determining, by the electronic processor, an actual torque based at least in part on the engine speed input, and setting, by the electronic processor, a torque strategy to operate an internal combustion engine at a high efficiency level when the desired torque is different than the actual torque.

Yet another exemplary embodiment is directed to a hybrid system comprising wheels, a battery, an internal combustion engine, an e-machine coupled to the battery, a transmission configured to apply the torque from the internal combustion engine and from the e-machine to the wheels, and an engine control unit having an electronic processor. The electronic processor is configured to receive inputs defining a current condition of the hybrid system, wherein the inputs include an acceleration input and an engine speed input of the internal combustion engine, determine a desired torque based at least in part on the acceleration input, determine an actual torque based at least in part on the engine speed input, and set a torque strategy to operate the internal combustion engine at a high efficiency level when the desired torque is different than the actual torque.

Other aspects of embodiments will become apparent by consideration of the detailed description and accompanying drawings.

DETAILED DESCRIPTION

Figure 1:
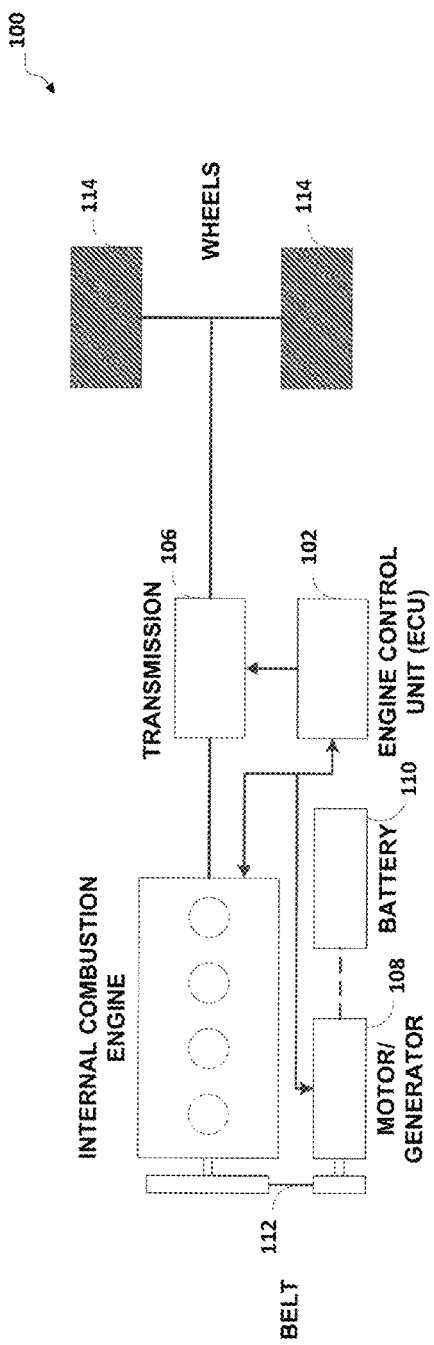
FIG. 1 is a block diagram illustrating a vehicle having a hybrid drivetrain that includes, among other things, an engine control unit that controls an internal combustion engine and an electric motor/generator.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Typically, the inefficient operation of the internal combustion engine is used when a future sudden change in torque is predicted and the rate of torque increase cannot be met by the torque matching strategy of the internal combustion engine. The inefficient operation of the internal combustion engine can also be used at idle conditions where the idle speed has to be regulated even when the torque demand on the internal combustion engine varies significantly.

Typically, the inefficient operation of the internal combustion engine is used to build up a reserve of torque in the internal combustion engine. However, the typical torque strategy of increasing air and fuel delivered to the combustion cylinders of the internal combustion engine cannot handle large rapid increases in torque demand due to relatively slow air path dynamics. Additionally, the inefficient operation of the internal combustion engine is typically actuated by setting the spark ignition timing to a non-optimal setting. Additionally or alternatively, the inefficient operation of the internal combustion engine can also be actuated via non-optimal injection timing or some other suitable actuation technique.

As described herein, an engine control unit ("ECU" or "controller") of an internal combustion engine may have one or more active torque control strategies, for example, one or more efficiency modes and/or a performance mode. The efficiency modes may include a torque step up strategy and/or a torque dip strategy. The performance mode may include a torque response for tip-in strategy. The active torque control strategies may be used when the desired torque (e.g., the torque demanded by a driver, a controller, or other suitable device) has a different value than the actual torque (e.g., the torque applied to the wheels).

The methods, devices, and systems as described herein allow the internal combustion engine to operate at a high efficiency level, thus improving fuel economy and/or performance of the hybrid system (e.g., a hybrid vehicle). There are several inputs to the internal combustion engine from a controller (e.g., the ECU) that control actuators of the internal combustion engine. The actuators include throttle position, spark timing, injection timing, cam position timings, and the like. The actuators convert the inputs from the controller into mechanical actions in the internal combustion engine. Different combinations of these actuators can be used to produce a desired amount of engine torque at a defined engine speed from the internal combustion engine. Each combination of actuators uses a different amount of fuel to achieve the same desired torque. In other words, each combination of actuators has a different combustion efficiency associated with the internal combustion engine. In some embodiments, as described herein operating the internal combustion engine at "high efficiency" or at a "high efficiency level" means using those combinations of actuators that result in 80% of peak efficiency or higher. For example, as described herein operating the internal combustion engine at "high efficiency" or at a "high efficiency level" means using those combinations of actuators that result in 90% of peak efficiency.

FIG. 1 is a block diagram of a vehicle 100 having, among other things, an electronic control unit (ECU) 102 that is configured to control operation of an internal combustion engine 104 in an efficiency mode or a performance mode. In the example of FIG. 1, the vehicle includes an engine control unit (ECU) 102, an internal combustion engine 104, a transmission 106, a motor/generator 108, a battery 110, a belt 112, and wheels 114.

In some examples, the ECU 102 may comprise one or more electronic processors including a microprocessor, a controller, a digital signal processor (DSP), an application specific integrated circuit (ASIC), a field-programmable gate array (FPGA), or equivalent discrete or integrated logic circuitry. In some examples, the ECU 102 may include multiple components. For example, the ECU 102 may include a combination of one or more microprocessors, one or more controllers, one or more DSPs, one or more ASICs, or one or more FPGAs, as well as other discrete or integrated logic circuitry. The functions attributed to ECU 102 herein may be embodied as software, firmware, hardware or a combination thereof.

In some examples, the ECU 102 includes a memory. The memory may include non-transitory computer-readable media. The non-transitory computer-readable media includes instructions that, when executed by an electronic processor, cause the ECU 102 to perform various functions attributed to the ECU 102 herein. The memory may also include various random access memory (RAM), read-only memory (ROM), or other memory. As described in further detail below, the memory may store, for example, diagnostic and estimated information or models regarding sensed physical parameters, programs (e.g., torque strategies) for operating the internal combustion engine 104 in an efficiency mode or a performance mode, sensor functions including instructions for sensing the physical parameters of the internal combustion engine 104, the accelerator, and the transmission 106, and/or schedules that define when to operate the internal combustion engine 104 in the efficiency mode or the performance mode.

In the example of FIG. 1, the internal combustion engine 104 is coupled to the wheels 114 via the transmission 106. The internal combustion engine 104 is coupled to the motor/generator 108 via the belt 112 (e.g., a chain). The motor/generator 108 is electrically connected (as shown by the dashed line) to the battery 110.

In the example of FIG. 1, the ECU 102 is communicatively coupled to and can control the internal combustion engine 104, the transmission 106, and the motor/generator 108. As described in greater detail below, the ECU 102 can control the internal combustion engine 104, the transmission 106, and the motor/generator 108 to operate in an efficiency mode or a performance mode when there is a difference between a desired torque and an actual torque.

In the efficiency mode, the ECU 102 can control the internal combustion engine 104 to operate in a highly efficient manner, and the excess torque generated by the internal combustion engine 104 can be stored in the battery 110 via the motor/generator 108 (i.e., an e-machine). For example, when the ECU 102 determines the desired torque is different from the actual torque, the ECU 102 increases the generator load on the internal combustion engine 104 via the belt 112 between the internal combustion engine 104 and the motor/generator 108 while the desired torque is different from the actual torque. The ECU 102 can control the motor/generator 108 to generate a torque reserve from the increased generator load and store the torque reserve in the battery 110. For example, the motor/generator 108 can convert the mechanical energy obtained from the generator load on the internal combustion engine 104 to electrical energy (i.e., a torque reserve) using electromagnetic induction. That is, the mechanical energy can be used to produce an electromotive force across a conductor exposed to time varying magnetic fields. In this way, the excess energy from the excess torque (i.e., the excess mechanical energy) is not wasted via inefficient operation of internal combustion engine 104, but instead the excess mechanical energy can be converted and stored as electrical energy (i.e., a torque reserve) in the battery 110 that can be used later (e.g., during the performance mode).

Additionally or alternatively, in the performance mode, the ECU 102 can control the motor/generator 108 to meet a rapid increase in torque demand that the internal combustion engine 104 cannot supply. For example, when the ECU 102 determines the desired torque is different than the actual torque, the ECU 102 controls the motor/generator 108 to provide a desired torque difference to the internal combustion engine 104 via the belt 112 to meet the torque demand. In some embodiments, the motor/generator 108 provides the desired torque difference to internal combustion engine 104 from a torque reserve already stored in the battery 110. In some embodiments, the ECU 102 controls the motor/generator 108 to slowly ramp down the torque output as the torque output of the internal combustion engine 104 increases to the new desired level of the desired torque.

Figure 2:
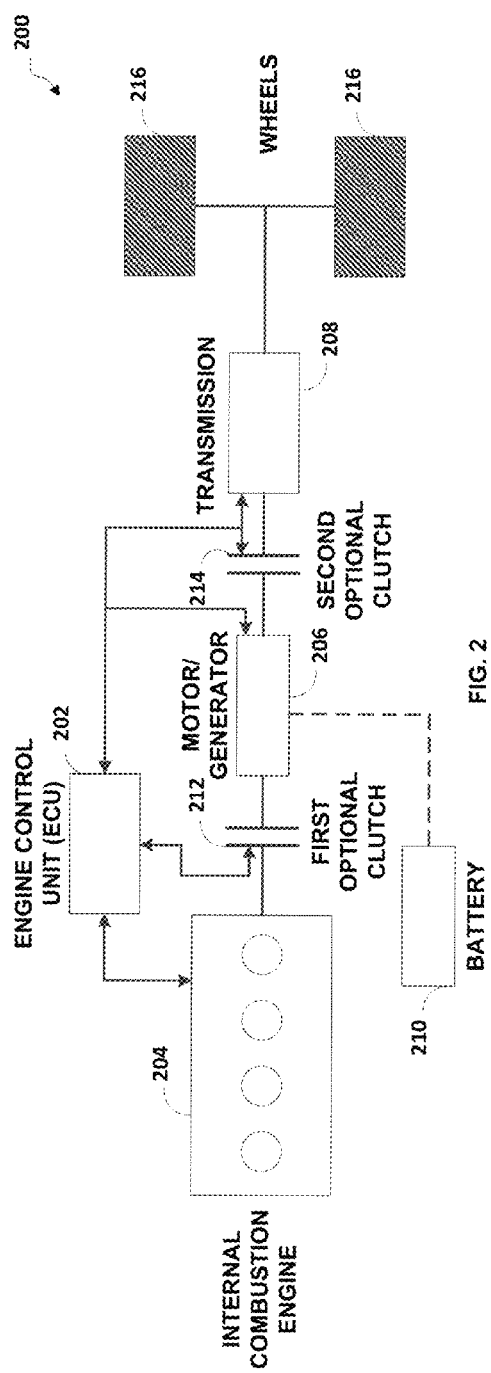
FIG. 2 is a block diagram illustrating another vehicle having a hybrid drivetrain that includes, among other things, an engine control unit that controls an internal combustion engine and an electric motor/generator.

FIG. 2 is a block diagram illustrating another vehicle 200 having a hybrid drivetrain that includes, among other things, an engine control unit (ECU) 202 that controls an internal combustion engine 204 and an electric motor/generator 206. In the example of FIG. 2, the vehicle 200 includes an engine control unit (ECU) 202, an internal combustion engine 204, a motor/generator 206, a transmission 208, a battery 210, a first optional clutch 212, a second optional clutch 214, and wheels 216.

In the example of FIG. 2, the internal combustion engine 204 is coupled to the motor/generator 206 via the first optional clutch 212. The motor/generator 206 is coupled to the transmission 208 via the second optional clutch 214, and the transmission 208 is coupled to the wheels 216. The motor/generator 206 is also electrically connected (as shown by the dashed line) to the battery 210.

In the example of FIG. 2, the ECU 202 is communicatively coupled to and can control the internal combustion engine 204, the first optional clutch 212, the motor/generator 206, the second optional clutch 214, and the transmission 208. As described in greater detail below, the ECU 202 can control the internal combustion engine 204, the first optional clutch 212, the motor/generator 206, the second optional clutch 214, and the transmission 208 to operate in an efficiency mode or a performance mode when there is a difference between a desired torque and an actual torque.

In the efficiency mode, the ECU 202 can control the internal combustion engine 204 to operate in a highly efficient manner, and the excess torque generated by the internal combustion engine 204 is converted to electrical energy via the motor/generator 206 (also referred to as an "e-machine") and stored in the battery 210. For example, when the ECU 202 controls the first and second optional clutches 212 and 214 to be at least partially closed and when the ECU 202 determines that the desired torque is different than the actual torque, the ECU 202 increases the generator load of the motor/generator 206 while the desired torque is different than the actual torque. The ECU 202 controls the motor/generator 206 to generate a torque reserve from the increased generator load and store the torque reserve in the battery 210. In this way, the excess energy from the excess torque is not wasted from inefficient operation of internal combustion engine 204 when the desired torque is different from the actual torque, but instead the excess energy can be stored as a torque reserve in the battery 210 that can be used later (e.g., during the performance mode).

Additionally or alternatively, in the performance mode, the ECU 202 can control the motor/generator 206 to meet a rapid increase in torque demand that the internal combustion engine 204 cannot supply. For example, when the ECU 202 controls the first and second optional clutches 212 and 214 to be at least partially closed and when the ECU 202 determines the desired torque is different than the actual torque, the ECU 202 can control the motor/generator 206 to provide a desired torque difference to the transmission 208 allowing the actual torque to be similar to the desired torque (i.e., to meet the torque demand). In some embodiments, the motor/generator 206 provides the desired torque difference to transmission 208 from a torque reserve already stored in the battery 210. In some embodiments, the ECU 202 controls the motor/generator 206 to slowly ramp down the torque output as the torque output of the internal combustion engine 204 reaches the new desired level of torque.

Figure 3:
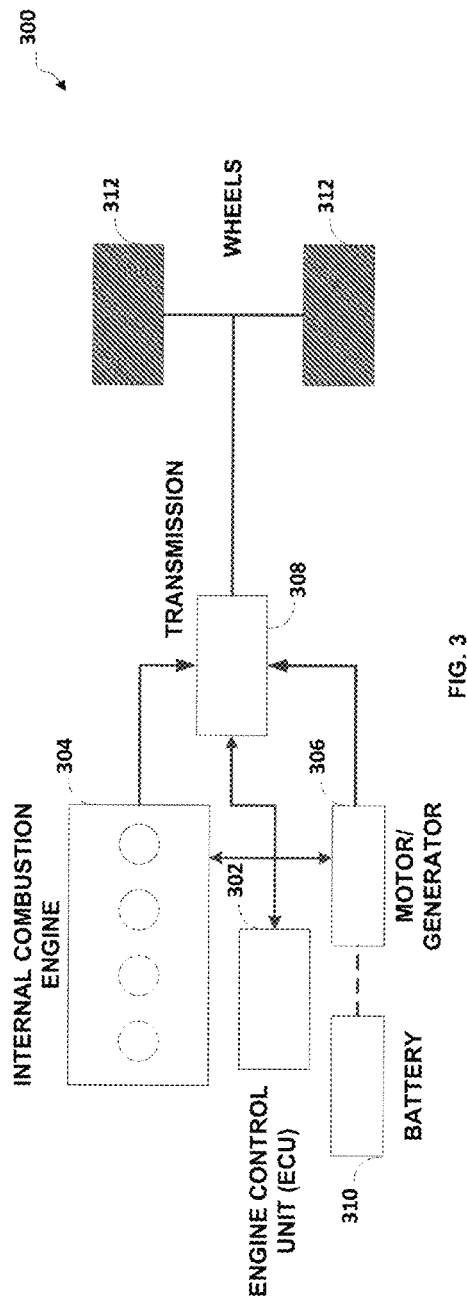
FIG. 3 is a block diagram illustrating yet another vehicle having a hybrid drivetrain that includes, among other things, an engine control unit that controls an internal combustion engine and an electric motor/generator.

FIG. 3 is a block diagram illustrating yet another vehicle 300 having a hybrid drivetrain that includes, among other things, an engine control unit (ECU) 302 that controls an internal combustion engine 304 and an electric motor/generator 306. In the example of FIG. 3, the vehicle 300 includes an engine control unit (ECU) 302, an internal combustion engine 304, a motor/generator 306, a transmission 308, a battery 310, and wheels 312.

In the example of FIG. 3, the internal combustion engine 304 and the motor/generator 306 are each separately coupled to the transmission 308, and the transmission 308 is coupled to the wheels 312. The motor/generator 306 is also electrically connected (as shown by the dashed line) to the battery 310.

In the example of FIG. 3, the ECU 302 is communicatively coupled to and can control the internal combustion engine 304, the motor/generator 306, and the transmission 308. As described in greater detail below, the ECU 302 can control the internal combustion engine 304, the motor/generator 306, and the transmission 308 to operate in an efficiency mode or a performance mode when there is a difference between a desired torque and an actual torque.

In one example, in the efficiency mode, the ECU 302 controls the internal combustion engine 304 to operate in a highly efficient manner, and the excess torque generated by the internal combustion engine 304 is stored in the battery 310 via the motor/generator 306 (also referred to as an "e-machine"). For example, when the ECU 302 determines that the desired torque is different than the actual torque, the ECU 302 increases the generator load of the motor/generator 306 while the desired torque is different than the actual torque. The ECU 302 controls the motor/generator 306 to generate a torque reserve from the increased generator load and store the torque reserve in the battery 310. In this way, the excess energy from the excess torque is not wasted from inefficient operation of internal combustion engine 304 when the desired torque is different from the actual torque, but instead the excess energy can be stored as a torque reserve in the battery 310 that can be used later (e.g., during the performance mode).

Additionally or alternatively, in the performance mode, the ECU 302 controls the motor/generator 306 to meet a rapid increase in torque demand. For example, when the ECU 302 determines the desired torque is different than the actual torque, the ECU 302 controls the motor/generator 306 to provide a desired torque difference to the transmission 308 allowing the actual torque to be similar to the desired torque (i.e., to meet the torque demand). In some embodiments, the motor/generator 306 provides the desired torque difference to transmission 308 from a torque reserve already stored in the battery 310. In some embodiments, the ECU 302 controls the motor/generator 306 to slowly ramp down the torque output as the torque output of the internal combustion engine 304 reaches the new desired level of torque.

Figure 4:
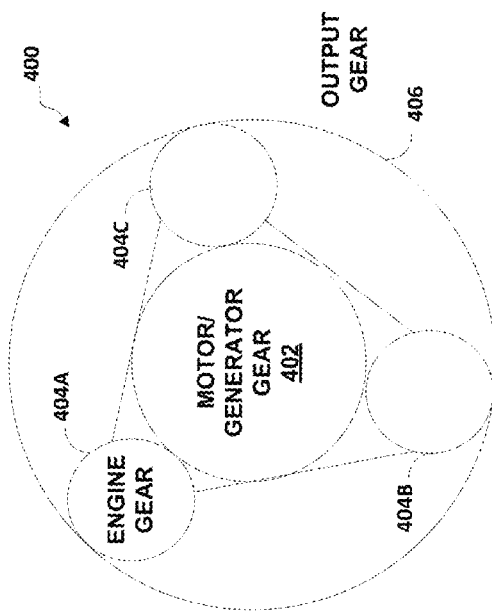
FIG. 4 is a schematic diagram illustrating a transmission for a hybrid system.

FIG. 4 is a schematic diagram illustrating a transmission 400 for a hybrid system. In the example of FIG. 4, the transmission 400 includes a motor/generator gear 402, engine gears 404A-404C (collectively "engine gears 404"), and an output gear 406. The motor/generator gear 402 is connected to the engine gears 404 and the engine gears 404 are connected to the output gear 406. The output gear 406 is connected to the wheels as described above. The motor/generator gear 402 is controlled by the motor/generator as described above. The engine gears are controlled by the internal combustion engine as described above.

When the internal combustion engine operates, the engine gears 404 provide torque (e.g., engine torque as described above and below) to the output gear 406. When the motor/generator operates, the motor/generator gear 402 either adds torque (e.g., adds a desired excess torque as described below) or subtracts torque (e.g., subtracts a desired torque difference as described below) from the output gear 406. For example, in the performance mode as described in greater detail below, the motor/generator gear 402 adds desired excess torque. Conversely, in the efficiency mode as described in greater detail below, the motor/generator gear 402 subtracts a desired torque difference from the output gear. In this way, the transmission 400 can operate the hybrid system in the efficiency and performance modes as described in greater detail below.

Figure 5:
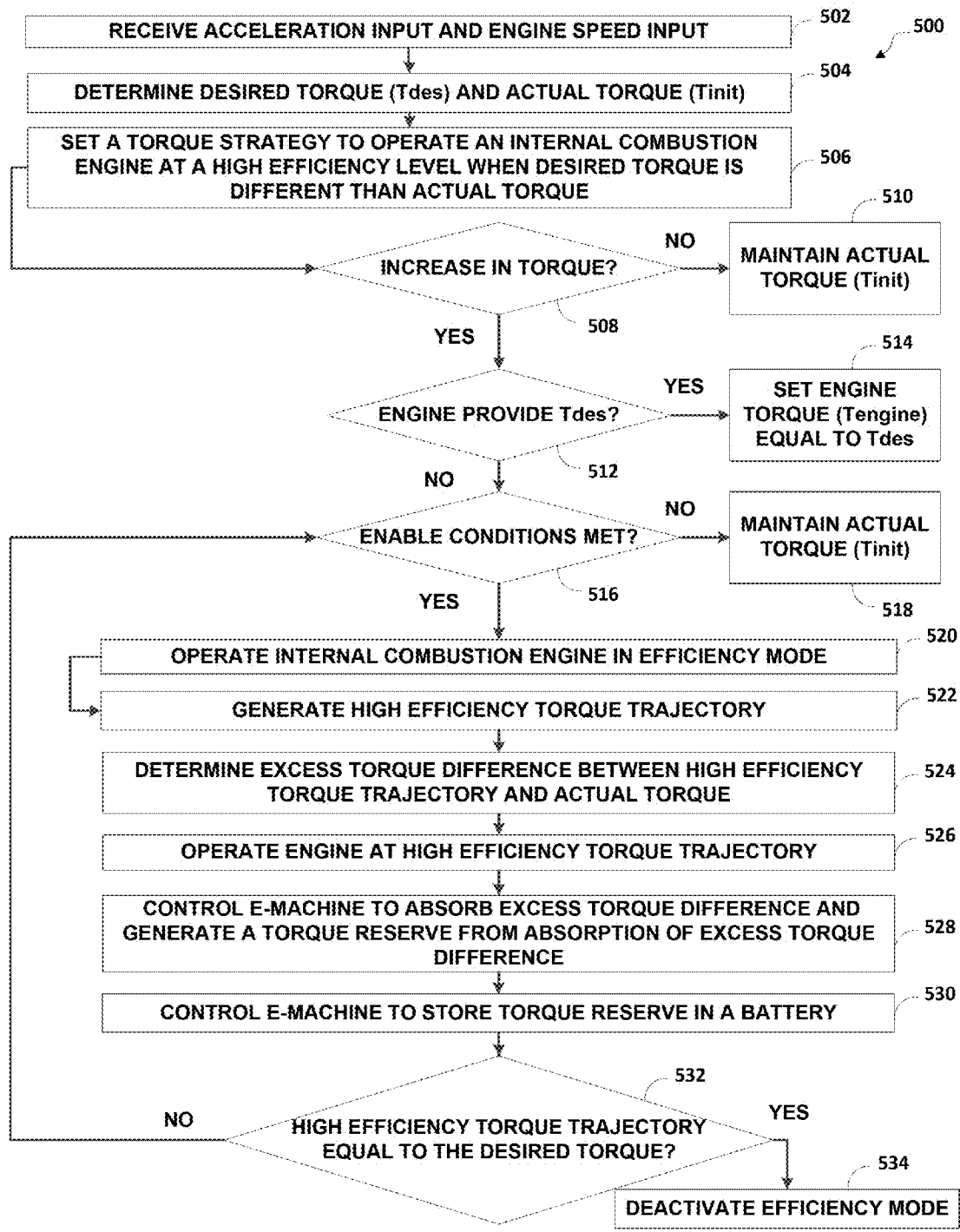
FIG. 5 is a flowchart illustrating a method for operating an internal combustion engine of a hybrid system in an efficiency mode.

FIG. 5 is a flowchart illustrating a method 500 for operating an internal combustion engine of a hybrid system in an efficiency mode. In the example of FIG. 5, at block 502, the engine control unit (ECU) as described above receives inputs defining a current condition of the hybrid system including an acceleration input (e.g., a pedal position input) and an engine speed input, and/or other suitable inputs that are indicative of a desired torque or an actual torque. At block 504, the ECU determines from some or all of the inputs the desired torque (Tdes) and the actual torque (Tinit). In other words, the desired torque and the actual torque are determined based on the current condition of the hybrid system. For example, the current condition of the hybrid system includes engine speed of the internal combustion engine as described above, actuator positions (spark, injection, cam timings, and the like), and/or sensor feedback. Additionally, in some embodiments, the desired torque is influenced by feedback from a driver (e.g. feedback from an accelerator, a brake, a clutch, a transmission, and/or a gear) and information from the vehicle and surroundings (e.g., vehicle speed, traffic information, camera inputs, radar inputs, and the like.) At block 506, after determining the desired torque and the actual torque, the ECU sets a torque strategy to operate an internal combustion engine at a high efficiency level when the desired torque is different than the actual torque.

To set the torque strategy, at decision block 508, the ECU determines whether there is a demand for an increase in torque (e.g., driver demands an increase in torque). Upon determining there is no demand for an increase in torque ("NO" at decision block 508), at block 510, the ECU maintains the actual torque. Upon determining there is a demand for an increase in torque ("YES" at decision block 508), at decision block 512, the ECU determines whether the internal combustion engine can provide the desired torque. Upon determining that the internal combustion engine can provide the desired torque ("YES" at decision block 512), at block 514, the ECU sets the engine torque (Tengine) equal to the desired torque. Upon determining that the internal combustion engine cannot provide the desired torque ("NO" at decision block 512), at decision block 516 the ECU determines whether enable conditions are met. The enable conditions are aspects of the overall hybrid system. For example, the enable conditions include the state-of-charge of the battery, the temperature of the motor/generator, the capability of the motor/generator (e.g., the torque capability), and other suitable conditions of the overall hybrid system. Upon determining the enable conditions are not met ("NO" at decision block 516), at block 518, the ECU maintains the actual torque (e.g., inefficient combustion via spark retard) and does not activate an efficiency mode. Upon determining that the enable conditions are met ("YES" at decision block 516), at block 520, the ECU operates the internal combustion engine in an efficiency mode.

To operate the internal combustion engine in the efficiency mode, at block 522, the ECU generates a high efficiency torque trajectory between the actual torque and the desired torque. At block 524, the ECU determines an excess torque difference between the high efficiency torque trajectory and the actual torque. At block 526, the ECU operates the internal combustion engine at the high efficiency torque trajectory (i.e., a high efficiency level) (e.g., uses actuators of the internal combustion engine w/high efficiency settings). At block 528, the ECU controls an e-machine (e.g., the motor/generator as described above) to absorb the excess torque difference and generate a torque reserve from an absorption of the excess torque difference. At block 530, the ECU also controls the e-machine to store the torque reserve in a battery as described above. In some embodiments, the ECU may determine that the excess torque difference exceeds the torque capability of the motor/generator and the ECU may control the motor/generator to only absorb a portion of the excess torque difference. For example, the portion of the excess torque difference may be equal to or less than the torque capability of the motor/generator.

At decision block 532, the ECU determines whether the high efficiency torque trajectory is equal to or within some tolerance of the desired torque (e.g., within 10% of the desired torque, or some other tolerance depending upon the application of the hybrid system). Upon determining that the high efficiency torque trajectory is equal to or within some tolerance of the desired torque ("YES" at decision block 532), the ECU deactivates the efficiency mode. Upon determining that the high efficiency torque trajectory is not equal to or within some tolerance of the desired torque ("NO" at decision block 532), at decision block 516, the ECU continues to operate the internal combustion engine in the efficiency mode as long as the enable conditions are still met ("YES" at decision block 516).

Figure 6:
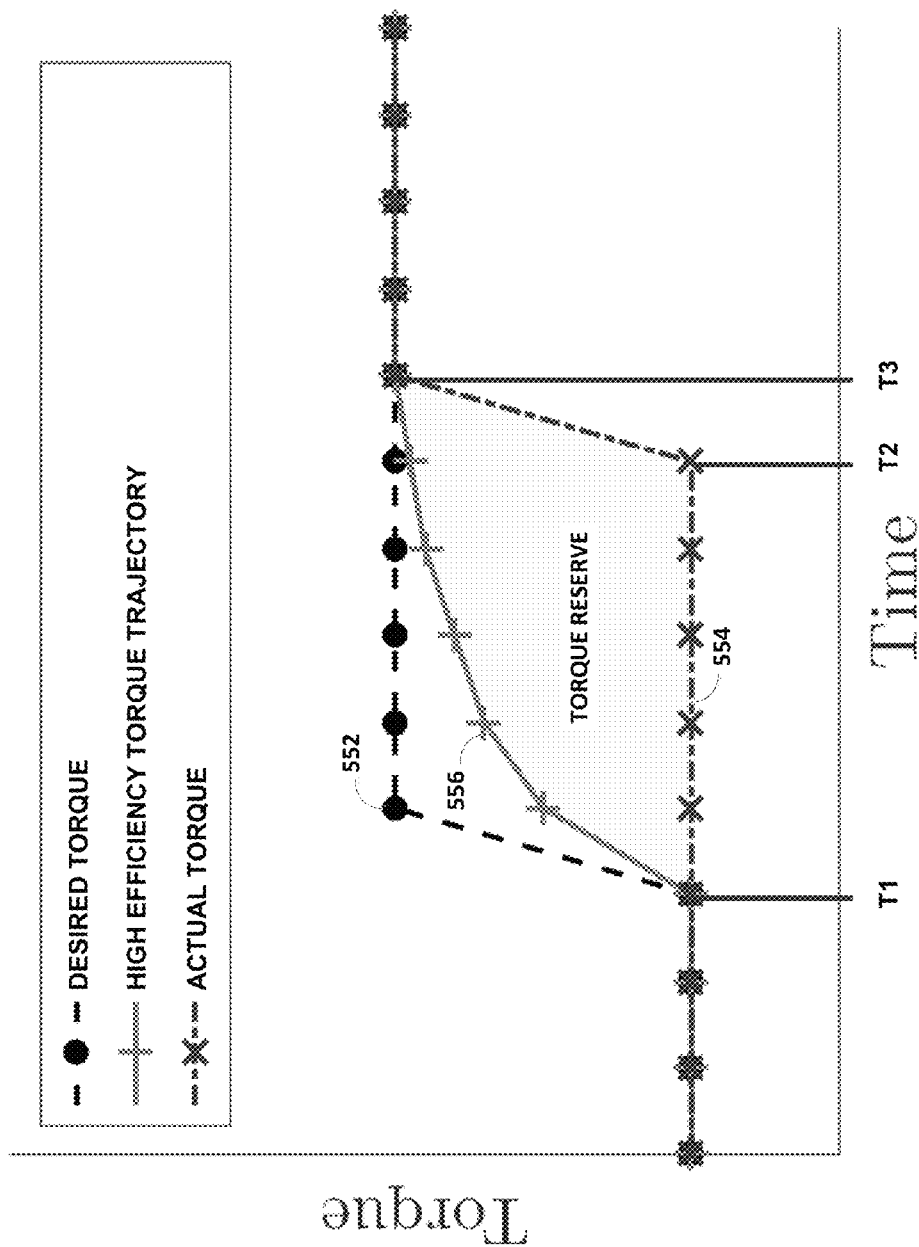
FIG. 6 is a graph illustrating differences between a desired torque plot, an actual torque plot, and a high efficiency torque trajectory when performing the method of FIG. 5.

FIG. 6 is a schematic illustrating differences between a desired torque plot 552, an actual torque plot 554, and a high efficiency torque trajectory 556 when performing the method of FIG. 5. In the example of FIG. 6, until the time T1 the desired torque 552 and the actual torque 554 are equal and the internal combustion engine is operating at a high efficiency level. At time T1, the ECU determines that there is a difference between the desired torque 552 and the actual torque 554 (e.g., there is a demand for an increase in torque), and the ECU sets a torque strategy to operate the internal combustion engine at the high efficiency level when there is difference between the desired torque 552 and the actual torque 554.

To set the torque strategy, the ECU determines whether the internal combustion engine can provide the desired torque 552. If at time T1, the ECU determines that the internal combustion engine cannot provide the desired torque 552, the ECU determines whether enable conditions as described above are met. If at time T1, the ECU determines that the enable conditions can be met, the ECU operates the internal combustion engine in an efficiency mode to capture the torque reserve (e.g., converting mechanical energy into electrical energy).

To operate the internal combustion engine in the efficiency mode, between time T1 and time T3, the ECU generates a high efficiency torque trajectory 556 between the desired torque 552 and the actual torque 554. The high efficiency torque trajectory 556 is the torque trajectory the engine can take from the actual torque 554 to the desired torque 552 while operating at a high efficiency level. Between time T1 and time T3, the ECU also determines an excess torque difference between the high efficiency torque trajectory 556 and the actual torque 554. Between time T1 and time T3, the ECU operates the internal combustion engine at the high efficiency torque trajectory 556 (i.e., the high efficiency level). Between time T1 and time T3, the ECU controls the e-machine to absorb the excess torque difference (e.g., the motor/generator as described above) and generate a torque reserve from an absorption of the excess torque difference. Between time T1 and time T3, the ECU also controls the e-machine to store the torque reserve in a battery. At time T2, the ECU determines that the internal combustion engine can provide the desired torque 552. It is understood that between time T1 and time T3, as illustrated in FIG. 6, the actual torque 554 is not equal to the high efficiency torque trajectory 556 because the ECU is operating the internal combustion engine in the efficiency mode as described above.

At time T3, the ECU determines that the high efficiency torque trajectory 556 is equal to the desired torque 552 and deactivates the efficiency mode. Similar to before time T1, after time T3, the desired torque 552 and the actual torque 554 are again equal and the internal combustion engine is still operating at a high efficiency level.

Figure 7:
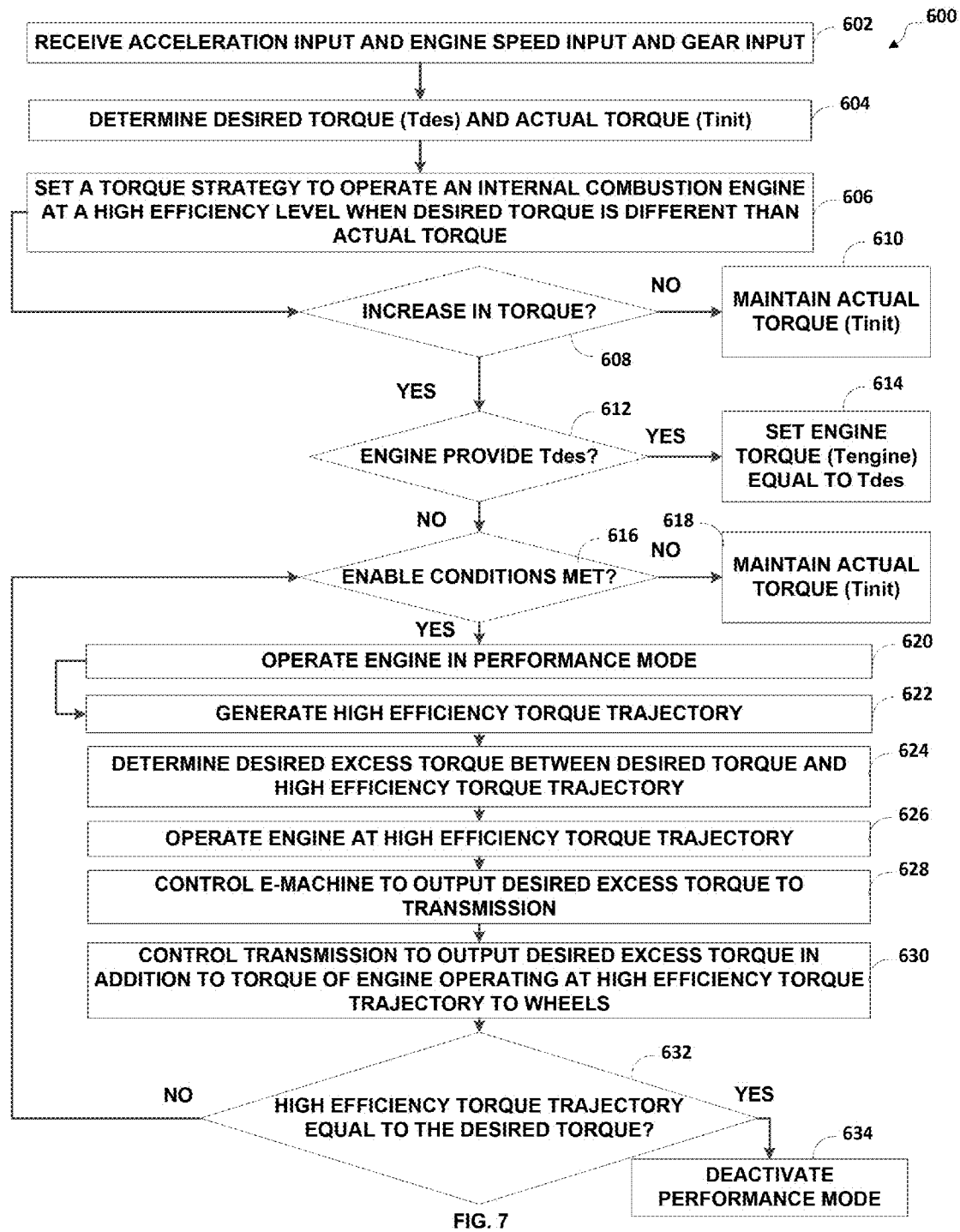
FIG. 7 is a flowchart illustrating a method for operating an internal combustion engine of a hybrid system in a performance mode.

FIG. 7 is a flowchart illustrating a method 600 for operating an internal combustion engine as described above of a hybrid system in a performance mode. In the example of FIG. 7, at block 602, the engine control unit (ECU) as described above receives inputs defining a current condition of the hybrid system including an acceleration input (e.g., a pedal position input), an engine speed input, a gear input (e.g., a gear position input), and/or other suitable inputs that are indicative of a desired torque or an actual torque. At block 604, the ECU determines from some or all of the inputs the desired torque (Tdes) and the actual torque (Tinit). In other words, the desired torque and the actual torque are determined based on the current condition of the hybrid system. For example, the current condition of the hybrid system includes engine speed of the internal combustion engine, actuator positions (spark, injection, cam timings, and the like), and/or sensor feedback. Additionally, in some embodiments, the desired torque is influenced by feedback from a driver (e.g. feedback from an accelerator, a brake, a clutch, and/or a gear) and information from the vehicle and surroundings (e.g., vehicle speed, traffic information, camera inputs, radar inputs, and the like.) After determining the desired torque and the actual torque, at block 606, the ECU sets a torque strategy to operate an internal combustion engine at a high efficiency level when the desired torque is different than the actual torque.

To set the torque strategy, at decision block 608, the ECU determines whether there is a demand for an increase in torque (e.g., driver demands an increase in torque). Upon determining there is no demand for an increase in torque ("NO" at decision block 608), at block 610, the ECU maintains the actual torque. Upon determining there is a demand for an increase in torque ("YES" at decision block 608), at decision block 612, the ECU determines whether the internal combustion engine can provide the desired torque. Upon determining that the internal combustion engine can provide the desired torque ("YES" at decision block 612), at block 614, the ECU sets the engine torque (Tengine) equal to the desired torque. Upon determining that the internal combustion engine cannot provide the desired torque ("NO" at decision block 612), at decision block 616, the ECU determines whether enable conditions as described above are met. Upon determining the enable conditions as described above are not met ("NO" at decision block 616), at block 618, the ECU maintains the actual torque (e.g., inefficient combustion via spark retard) and does not activate a performance mode. Upon determining that the enable conditions as described above are met ("YES" at decision block 616), at block 620, the ECU operates the internal combustion engine in the performance mode.

To operate the internal combustion engine in the performance mode, at block 622, the ECU generates a high efficiency torque trajectory. At block 624, the ECU determines a desired excess torque between the high efficiency torque trajectory and the desired torque. At block 626, the ECU operates the internal combustion engine at the high efficiency torque trajectory (i.e., the high efficiency level). At block 628, the ECU controls the e-machine to output the desired excess torque (e.g., the motor/generator as described above) to a transmission of the hybrid system. In other words, the ECU controls the e-machine to use power from a power source (e.g. power from recuperation during braking, power from charging the battery from an outlet, power from a torque reserve stored in the battery, or any other suitable power source) to provide the desired excess torque. At block 630, the ECU also controls the transmission to output the desired excess torque in addition to a torque of the internal combustion engine operating at the high efficiency torque trajectory to the wheels of the hybrid system. In this way, the ECU can control the transmission to output an actual torque that meets the desired torque.

At decision block 632, the ECU determines whether the high efficiency torque trajectory is equal to or within some tolerance of the desired torque. Upon the ECU determining that the high efficiency torque trajectory is equal to or within some tolerance of the desired torque ("YES" at decision block 632), at block 634, the ECU deactivates the performance mode. Upon the ECU determining that the high efficiency torque trajectory is not equal to or within some tolerance of the desired torque ("NO" at decision block 632), at decision block 616, the ECU continues to operate the internal combustion engine in the performance mode as long as the enable conditions are still met ("YES" at decision block 616).

Figure 8:
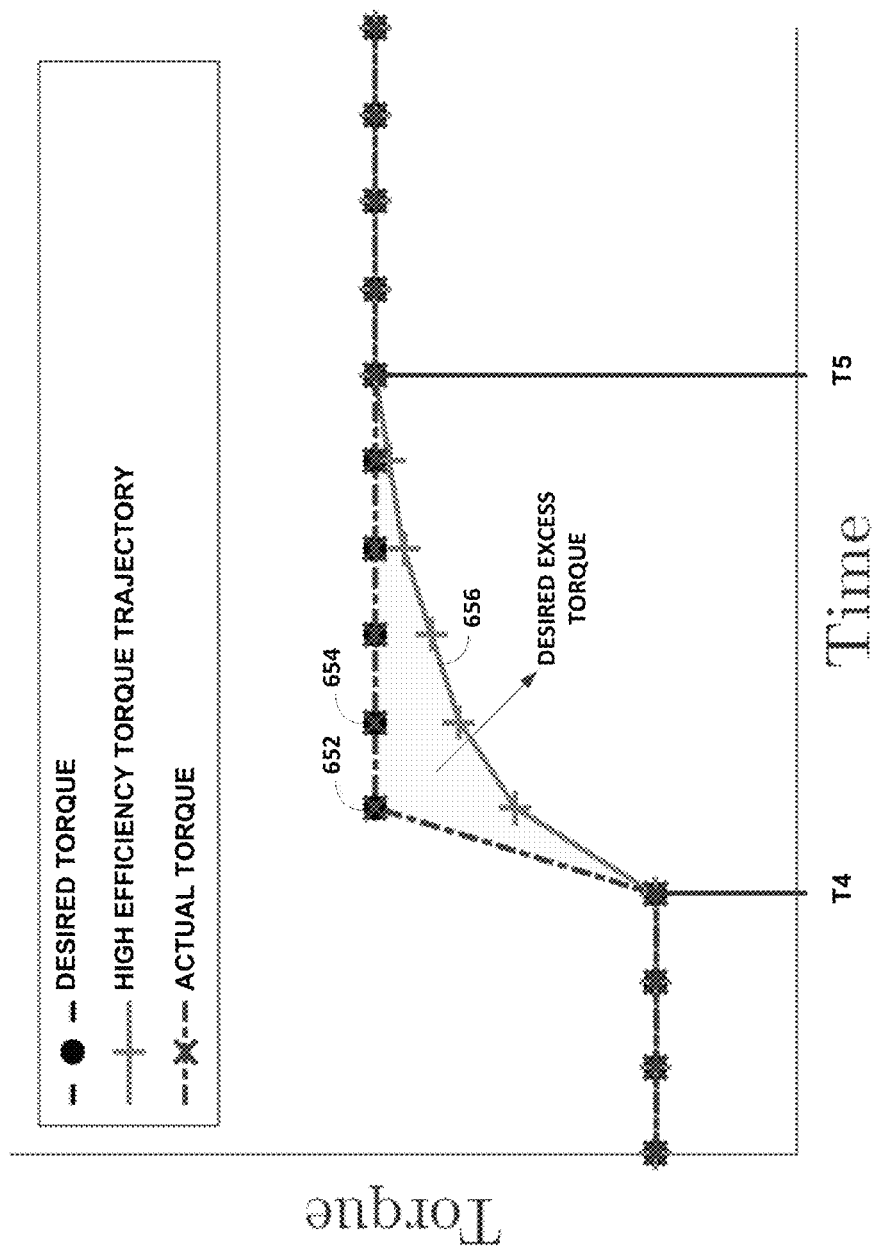
FIG. 8 is a graph illustrating differences between a desired torque plot, an actual torque plot, and a high efficiency torque trajectory when performing the method of FIG. 7.

FIG. 8 is a schematic diagram illustrating differences between a desired torque plot 652, an actual torque plot 654, and a high efficiency torque trajectory 656 when performing the method of FIG. 7. In the example of FIG. 8, until the time T4 the desired torque 652 and the actual torque 654 are equal and the internal combustion engine is operating at a high efficiency level. At time T4, the ECU determines that there is difference between the desired torque 652 and the actual torque 654 (e.g., there is a demand for an increase in torque), and the ECU sets a torque strategy to operate the internal combustion engine at the high efficiency level when there is difference between the desired torque 652 and the actual torque 654.

To set the torque strategy, the ECU determines whether the internal combustion engine can provide the desired torque 652. If at time T4, the ECU determines that the internal combustion engine cannot provide the desired torque 652, the ECU determines whether enable conditions as described above are met. If at time T4, the ECU determines that the enable conditions can be met, the ECU operates the internal combustion engine in a performance mode.

To operate the internal combustion engine in the performance mode, between time T4 and time T5, the ECU generates a high efficiency torque trajectory 656. The high efficiency torque trajectory 656 is the torque trajectory the engine can take while operating at a high efficiency level. Between time T4 and time T5, the ECU also determines a desired excess torque between the high efficiency torque trajectory 656 and the desired torque 652. Between time T4 and time T5, the ECU operates the internal combustion engine at the high efficiency torque trajectory 656 (i.e., the high efficiency level). Between time T4 and time 5, the ECU controls the e-machine to output the desired excess torque (e.g., the motor/generator as described above). For example, the ECU controls the e-machine to output the desired excess torque (i.e., mechanical energy) using electrical energy stored in a battery. In some embodiments, some or all of the electrical energy used by the e-machine to output the desired torque 652 may be a torque reserve stored in the battery from operating the internal combustion engine in an efficiency mode as described in greater detail above and below. It is understood that between time T4 and time T5, as illustrated in FIG. 8, the actual torque 654 is equal to desired torque 652 and not the high efficiency torque trajectory 656 because the ECU is operating the internal combustion engine in the performance mode as described above.

At time T5, the ECU determines that the high efficiency torque trajectory 656 is equal to the desired torque 652 and deactivates the performance mode. Similar to before time T4, after time T5, the desired torque 652 and the actual torque 654 are again equal and the internal combustion engine is still operating at a high efficiency.

Figure 9:
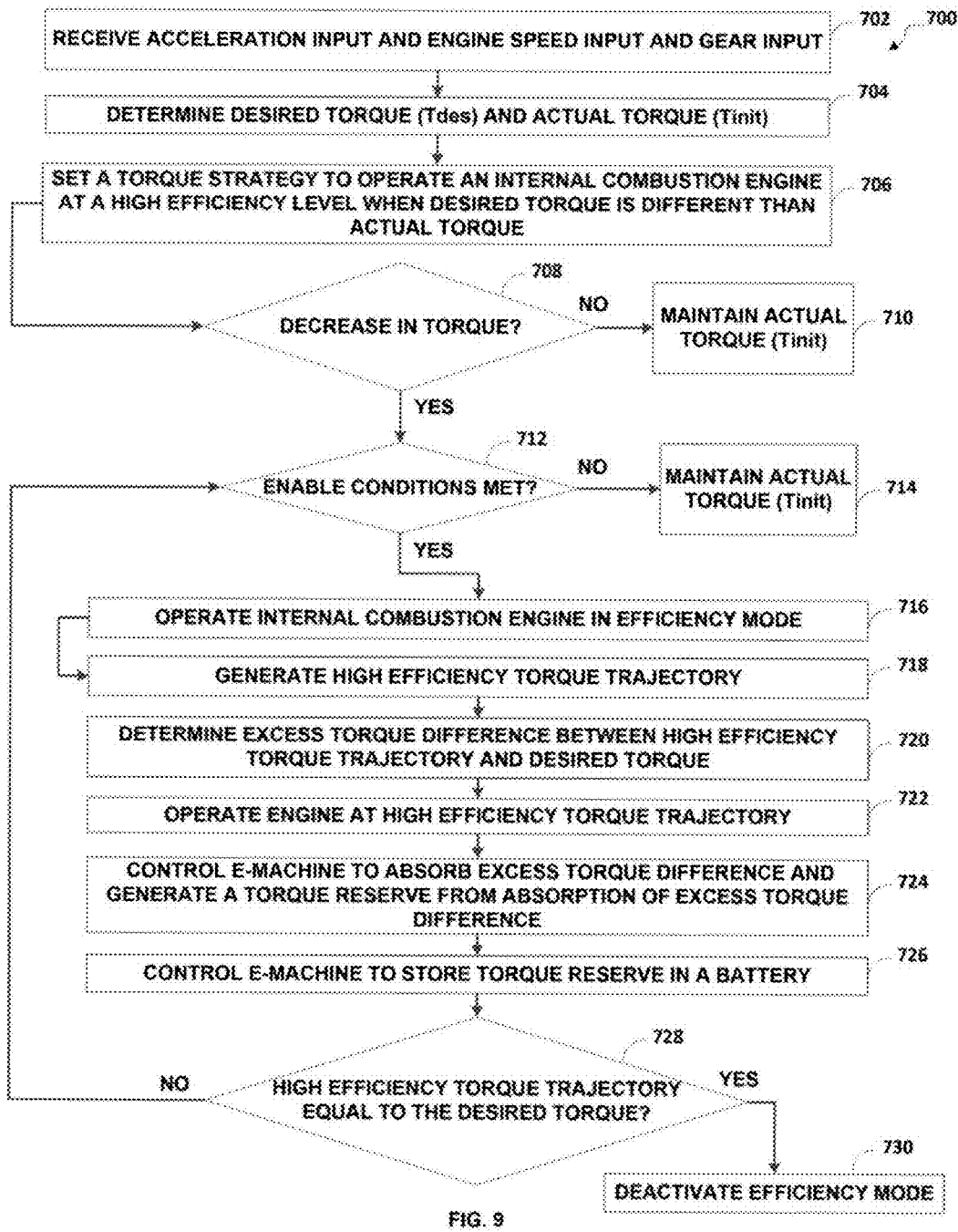
FIG. 9 is a flowchart illustrating a method for operating an internal combustion engine of a hybrid system in another efficiency mode.

FIG. 9 is a flowchart illustrating a method 700 for operating an internal combustion engine as described above of a hybrid system in another efficiency mode. In the example of FIG. 9, at block 702, the engine control unit (ECU) as described above receives inputs defining a current condition of the hybrid system including an acceleration input (e.g., a pedal position input), an engine speed input, a gear input (e.g., a gear position input) and/or other suitable inputs that are indicative of a desired torque or an actual torque. At block 704, the ECU determines from some or all of the inputs the desired torque (Tdes) and the actual torque (Tinit). In other words, the desired torque and the actual torque are determined based on the current condition of the hybrid system. For example, the current condition of the hybrid system includes engine speed of the internal combustion engine, actuator positions (spark, injection, cam timings, and the like), and/or sensor feedback. Additionally, in some embodiments, the desired torque is influenced by feedback from a driver (e.g. feedback from an accelerator, a brake, a clutch, and/or a gear) and information from the vehicle and surroundings (e.g., vehicle speed, traffic information, camera inputs, radar inputs, and the like.) After determining the desired torque and the actual torque, at block 706, the ECU sets a torque strategy to operate an internal combustion engine at a high efficiency level when the desired torque is different than the actual torque.

To set the torque strategy, at decision block 708, the ECU determines whether there is a demand for a decrease in torque (e.g., a sudden and temporary drop in torque, a gear shift). Upon determining there is not a demand for a decrease in torque ("NO" at decision block 708), at block 710, the ECU maintains the actual torque. Upon determining there is a demand for a decrease in torque ("YES" at decision block 708), at decision block 712, the ECU determines whether enable conditions as described above are met. Upon determining the enable conditions are not met ("NO" at decision block 712), at block 714 the ECU maintains the actual torque (e.g., inefficient combustion via spark retard) and does not activate an efficiency mode. Upon determining that the enable conditions are met ("YES" at decision block 712), at block 716, the ECU operates the internal combustion engine in an efficiency mode.

To operate the internal combustion engine in the efficiency mode, at block 718, the ECU generates a high efficiency torque trajectory. The high efficiency torque trajectory is the torque trajectory the engine can take while operating at a high efficiency level (e.g., actuators of the internal combustion engine operate with high efficiency settings). At block 720, the ECU determines an excess torque difference between the high efficiency torque trajectory and the desired torque. At block 722, the ECU operates the internal combustion engine at the high efficiency torque trajectory (i.e., the high efficiency level). At block 724, the ECU controls the e-machine to absorb the excess torque difference (e.g., the motor/generator as described above) and generate a torque reserve from absorption of the excess torque difference. At block 726, the ECU also controls the e-machine to store the torque reserve in a battery. In some embodiments, the ECU may determine that the excess torque difference exceeds the torque capability of the motor/generator and the ECU may control the motor/generator to only absorb a portion of the excess torque difference. For example, the portion of the excess torque difference may be equal to or less than the torque capability of the motor/generator.

At decision block 728, the ECU determines whether the high efficiency torque trajectory is equal to or within some tolerance of the desired torque. Upon determining that the high efficiency torque trajectory is equal to or within some tolerance of the desired torque ("YES" at decision block 728), at block 730, the ECU deactivates the efficiency mode. Upon determining that the high efficiency torque trajectory is not equal to or within some tolerance of the desired torque ("NO" at decision block 728), at decision block 712, the ECU continues to operate the internal combustion engine in the efficiency mode as long as the enable conditions as described above are still met ("YES" at decision block 712).

Figure 10:
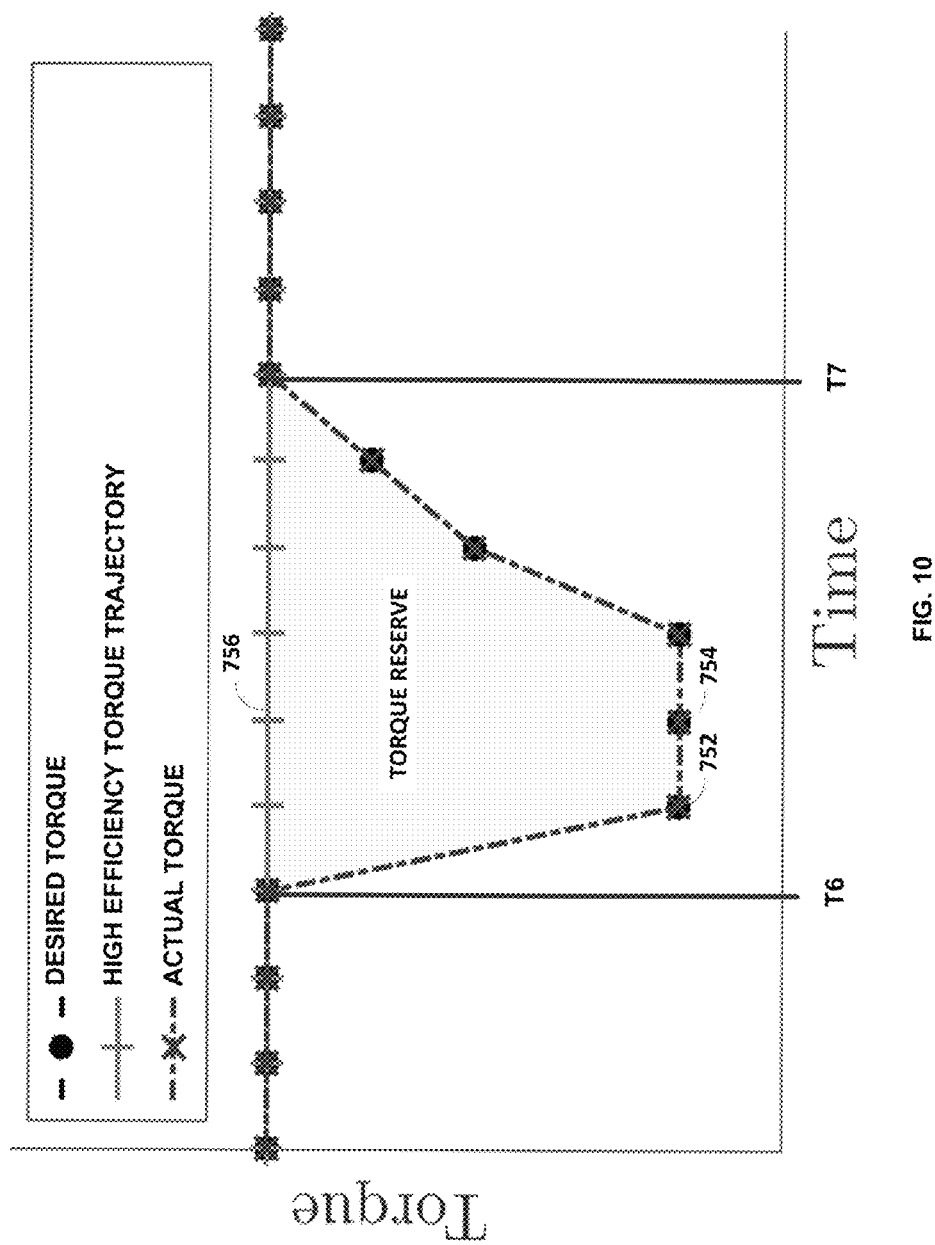
FIG. 10 is a graph illustrating differences between a desired torque plot, an actual torque plot, and a high efficiency torque trajectory when performing the method of FIG. 9.

FIG. 10 is a schematic diagram illustrating differences between a desired torque plot 752, an actual torque plot 754, and a high efficiency torque trajectory 756 when performing the method of FIG. 9. In the example of FIG. 10, until the time T6 the desired torque 752 and the actual torque 754 are equal and the internal combustion engine is operating at a high efficiency. At time T6, the ECU determines that there is difference between the desired torque 752 and the actual torque 754 (e.g., there is a demand for a decrease or a sudden and temporary drop in torque), and the ECU sets a torque strategy to operate the internal combustion engine at the high efficiency level when there is difference between the desired torque 752 and the actual torque 754.

To set the torque strategy, the ECU determines whether enable conditions as described above can be met. If at time T6, the ECU determines that the enable conditions can be met, the ECU operates the internal combustion engine in an efficiency mode to capture the torque reserve (e.g., converting mechanical energy into electrical energy).

To operate the internal combustion engine in the efficiency mode, between time T6 and time T7, the ECU generates a high efficiency torque trajectory 756. The high efficiency torque trajectory 756 is the torque trajectory the engine can take while operating at a high efficiency level. Between time T6 and time T7, the ECU also determines an excess torque difference between the high efficiency torque trajectory 756 and the desired torque 752 (or the actual torque 754). Between time T6 and time T7, the ECU operates the internal combustion engine at the high efficiency torque trajectory 756 (i.e., the high efficiency level). Between time T6 and time T7, the ECU controls the e-machine to absorb the excess torque difference (e.g., the motor/generator as described above) and generate a torque reserve (i.e., electrical energy) from absorption of the excess torque difference. Between time T6 and time T7, the ECU also controls the e-machine to store the torque reserve in a battery. It is understood that between time T6 and time T7, as illustrated in FIG. 10, the actual torque 754 is equal to desired torque 752 and not the high efficiency torque trajectory 756 because the ECU is operating the internal combustion engine in the efficiency mode as described above.

At time T7, the ECU determines that the high efficiency torque trajectory 756 is equal to the desired torque 752 and deactivates the efficiency mode. Similar to before time T6, after time T7, the desired torque 752 and the actual torque 754 are again equal and the internal combustion engine is still operating at a high efficiency.

Thus, embodiments provide, among other things, devices, systems, and methods for operating an internal combustion engine at a high efficiency in an efficiency mode or a performance mode when a desired torque is different than an actual torque. The efficiency mode generates a torque reserve that can be stored in a battery of the hybrid system. The performance mode provides a fast torque response from electrical energy stored in the hybrid system (e.g., the torque reserve stored in the battery). In one example, a first efficiency mode is used when the desired torque is greater than the actual torque. In another example, the performance mode is used when the desired torque is greater than the actual torque. In yet another example, a second efficiency mode is used when the desired torque is less than the actual torque. Operating the internal combustion engine at a high efficiency in the efficiency mode or the performance mode increases fuel efficiency and the overall performance of the hybrid system. It is understood that the efficiency mode (e.g., the first or second efficiency modes) and the performance mode can be used in tandem with each other, or independently of each other. In addition, it should be understood that the functionality performed by the controller can be combined and distributed in numerous configurations. Various features and advantages of the invention are set forth in the following claims.

What is claimed is:

1. A controller for a hybrid system comprising:
an electronic processor configured to
receive inputs defining a current condition of the hybrid system, wherein the inputs include an acceleration input and an engine speed input,
determine a desired torque based at least in part on the acceleration input,
determine an actual torque based at least in part on the engine speed input, and
set a torque strategy to operate an internal combustion engine at a high efficiency level when the desired torque is different than the actual torque,
wherein, to set the torque strategy, the electronic processor is further configured to
determine whether an increase in a torque of the internal combustion engine is desired based on the desired torque,
determine whether the internal combustion engine can provide the desired torque,
determine whether enable conditions of the hybrid system are met,
responsive to determining that there is a desired increase in the torque of the internal combustion engine, that the internal combustion engine cannot provide the desired torque, and that the enable conditions of the hybrid system are met, operate the internal combustion engine at the high efficiency level in one of an efficiency mode or a performance mode.

2. The controller of claim 1, wherein, to operate the internal combustion engine at the high efficiency level in the efficiency mode, the electronic processor is further configured to
generate a high efficiency torque trajectory between the desired torque and the actual torque,
determine an excess torque difference between the high efficiency torque trajectory and the actual torque,
operate the internal combustion engine at the high efficiency torque trajectory,
control an e-machine to absorb the excess torque difference and generate a torque reserve from an absorption of the excess torque difference, and
control the e-machine to store the torque reserve in a battery of the hybrid system.

3. The controller of claim 1, wherein, to operate the internal combustion engine at the high efficiency level in the performance mode, the electronic processor is further configured to
generate a high efficiency torque trajectory,
determine a desired excess torque between the desired torque and the high efficiency torque trajectory,
operate the internal combustion engine at the high efficiency torque trajectory,
control an e-machine of the hybrid system to output the desired excess torque to a transmission of the hybrid system, and
control the transmission to output the desired excess torque in addition to a torque of the internal combustion engine operating at the high efficiency torque trajectory to wheels of the hybrid system.

4. The controller of claim 3, wherein, to control the e-machine to output the desired excess torque to the transmission of the hybrid system, the electronic processor is further configured to control the e-machine to generate the desired excess torque using electrical energy stored in a battery of the hybrid system.

5. The controller of claim 4, wherein the electrical energy stored in the battery further includes a torque reserve, wherein the torque reserve is electrical energy generated from operating the internal combustion engine at the high efficiency level in the efficiency mode.

6. A controller for a hybrid system comprising:
an electronic processor configured to
receive inputs defining a current condition of the hybrid system, wherein the inputs include an acceleration input and an engine speed input,
determine a desired torque based at least in part on the acceleration input,
determine an actual torque based at least in part on the engine speed input, and
set a torque strategy to operate an internal combustion engine at a high efficiency level when the desired torque is different than the actual torque,
wherein, to set the torque strategy, the electronic processor is further configured to
determine whether a decrease in the torque of the internal combustion engine is desired,
determine whether enable conditions of the hybrid system are met, and
responsive to determining that the decrease in the torque of the internal combustion engine is desired and that the enable conditions of the hybrid system are met, operate the internal combustion engine at the high efficiency level in an efficiency mode,
wherein, to operate the internal combustion engine at the high efficiency level in the efficiency mode, the electronic processor is further configured to
generate a high efficiency torque trajectory,
determine an excess torque difference between the high efficiency torque trajectory and the desired torque,
operate the internal combustion engine at the high efficiency torque trajectory,
control an e-machine to absorb the excess torque difference and generate a torque reserve from an absorption of the excess torque difference, and
control the e-machine to store the torque reserve in a battery of the hybrid system.

7. A method for controlling a hybrid system, the method comprising:
receiving, by an electronic processor, inputs defining a current condition of the hybrid system, wherein the inputs include an acceleration input and an engine speed input;
determining, by the electronic processor, a desired torque based at least in part on the acceleration input;
determining, by the electronic processor, an actual torque based at least in part on the engine speed input; and
setting, by the electronic processor, a torque strategy to operate an internal combustion engine at a high efficiency level when the desired torque is different than the actual torque
wherein setting the torque strategy further includes
determining whether an increase in a torque of the internal combustion engine is desired based on the desired torque;
determining whether the internal combustion engine can provide the desired torque;
determining whether enable conditions of the hybrid system are met; and
responsive to determining that there is a desired increase in the torque of the internal combustion engine, that the internal combustion engine cannot provide the desired torque, and that the enable conditions of the hybrid system are met, operating the internal combustion engine at the high efficiency level in one of an efficiency mode or a performance mode.

8. The method of claim 7, wherein operating the internal combustion engine at the high efficiency level in the efficiency mode further includes
generating a high efficiency torque trajectory between the desired torque and the actual torque;
operating the internal combustion engine at the high efficiency torque trajectory;
determining an excess torque difference between the high efficiency torque trajectory and the actual torque;
controlling an e-machine to absorb the excess torque difference and to generate a torque reserve; and
controlling the e-machine to store the torque reserve in a battery of the hybrid system.

9. The method of claim 7, wherein operating the internal combustion engine at the high efficiency level in the performance mode further includes
generating a high efficiency torque trajectory;
determining a desired excess torque between the desired torque and the high efficiency torque trajectory;
operating the internal combustion engine at the high efficiency torque trajectory;
controlling an e-machine of the hybrid system to output the desired excess torque to a transmission of the hybrid system; and
controlling the transmission to output the actual torque that meets the desired torque by adding the desired excess torque to a torque of the internal combustion engine operating at the high efficiency torque trajectory.

10. The method of claim 9, wherein controlling the e-machine of the hybrid system to output the desired excess torque to the transmission of the hybrid system further includes controlling the e-machine to generate the desired excess torque using electrical energy stored in a battery.

11. The method of claim 10, wherein the electrical energy stored in the battery further includes a torque reserve, wherein the torque reserve is electrical energy generated from operating the internal combustion engine at the high efficiency level in the efficiency mode.

12. A method for controlling a hybrid system, the method comprising:
receiving, by an electronic processor, inputs defining a current condition of the hybrid system, wherein the inputs include an acceleration input and an engine speed input;
determining, by the electronic processor, a desired torque based at least in part on the acceleration input;
determining, by the electronic processor, an actual torque based at least in part on the engine speed input; and
setting, by the electronic processor, a torque strategy to operate an internal combustion engine at a high efficiency level when the desired torque is different than the actual torque
wherein setting the torque strategy further includes
determining whether a decrease in the torque of the internal combustion engine is desired;
determining whether enable conditions of the hybrid system are met; and
responsive to determining that the decrease in the torque of the internal combustion engine is desired and that the enable conditions of the hybrid system are met, operating the internal combustion engine at the high efficiency level in an efficiency mode by generating a high efficiency torque trajectory;
determining an excess torque difference between the high efficiency torque trajectory and the desired torque;

operating the internal combustion engine at the high efficiency torque trajectory;

controlling an e-machine to absorb the excess torque difference and generate a torque reserve from absorbing the excess torque difference; and controlling the e-machine to store the torque reserve in a battery of the hybrid system.

13. A hybrid system comprising:

wheels;

a battery;

an internal combustion engine;

an e-machine coupled to the battery;

a transmission configured to apply the torque from the internal combustion engine and from the e-machine to the wheels; and an engine control unit having an electronic processor configured to receive inputs defining a current condition of the hybrid system, wherein the inputs include an acceleration input and an engine speed input of the internal combustion engine, determine a desired torque based at least in part on the acceleration input, determine an actual torque based at least in part on the engine speed input, and set a torque strategy to operate the internal combustion engine at a high efficiency level when the desired torque is different than the actual torque wherein, to set the torque strategy, the electronic processor is further configured to determine whether an increase in a torque of the internal combustion engine is desired based on the desired torque, determine whether the internal combustion engine can provide the desired torque, determine whether enable conditions of the hybrid system are met, responsive to determining that there is a desired increase in the torque of the internal combustion engine, that the internal combustion engine cannot provide the desired torque, and that the enable conditions of the hybrid system are met, operate the internal combustion engine at the high efficiency level in one of an efficiency mode or a performance mode.

14. The hybrid system of claim 13, wherein, to operate the internal combustion engine at the high efficiency level in the efficiency mode, the electronic processor is further configured to generate a high efficiency torque trajectory between the desired torque and the actual torque, operate the internal combustion engine at the high efficiency torque trajectory, determine an excess torque difference between the high efficiency torque trajectory and the actual torque, control the e-machine to absorb the excess torque difference and generate a torque reserve from an absorption of the excess torque difference, and control the e-machine to store the torque reserve in the battery of the hybrid system.

15. The hybrid system of claim 13, wherein, to operate the internal combustion engine at the high efficiency level in the performance mode, the electronic processor is further configured to generate a high efficiency torque trajectory, determine a desired excess torque between the desired torque and the high efficiency torque trajectory, operate the internal combustion engine at the high efficiency torque trajectory, control the e-machine to output the desired excess torque to the transmission, and control the transmission to output the desired excess torque in addition to a torque of the internal combustion engine operating at the high efficiency torque trajectory to the wheels.

16. The hybrid system of claim 15, wherein, to control the e-machine to output the desired excess torque to the transmission, the electronic processor is further configured to control the e-machine to generate the desired excess torque using electrical energy stored in the battery, wherein the electrical energy stored in the battery includes a torque reserve, wherein the torque reserve is electrical energy generated from operating the internal combustion engine at the high efficiency level in the efficiency mode.

17. A hybrid system comprising:

wheels;

a battery;

an internal combustion engine;

an e-machine coupled to the battery;

a transmission configured to apply the torque from the internal combustion engine and from the e-machine to the wheels; and an engine control unit having an electronic processor configured to receive inputs defining a current condition of the hybrid system, wherein the inputs include an acceleration input and an engine speed input of the internal combustion engine, determine a desired torque based at least in part on the acceleration input, determine an actual torque based at least in part on the engine speed input, and set a torque strategy to operate the internal combustion engine at a high efficiency level when the desired torque is different than the actual torque wherein, to set the torque strategy, the electronic processor is further configured to determine whether a decrease in the torque of the internal combustion engine is desired, determine whether enable conditions of the hybrid system are met, and responsive to determining that the decrease in the torque of the internal combustion engine is desired and that the enable conditions of the hybrid system are met, operate the internal combustion engine at the high efficiency level in an efficiency mode, wherein, to operate the internal combustion engine at the high efficiency level in the efficiency mode, the electronic processor is further configured to generate a high efficiency torque trajectory, determine an excess torque difference between the high efficiency torque trajectory and the desired torque, operate the internal combustion engine at the high efficiency torque trajectory, control the e-machine to absorb the excess torque difference and generate a torque reserve from an absorption of the excess torque difference, and control the e-machine to store the torque reserve in the battery of the hybrid system.

\* \* \* \* \*